US009286170B2

(12) United States Patent
Bauer et al.

(10) Patent No.: US 9,286,170 B2
(45) Date of Patent: Mar. 15, 2016

(54) PREVENTING EXTREME CORESIDENCY HAZARDS IN CLOUD COMPUTING

(71) Applicant: Alcatel-Lucent, Boulogne Billancourt (FR)

(72) Inventors: Eric J. Bauer, Freehold, NJ (US); Randee S. Adams, Naperville, IL (US); Daniel W. Eustace, Napaerville, IL (US); Kedar S. Namjoshi, Backing Ridge, NJ (US); Lyle D. Kipp, Naperville, IL (US)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/558,983

(22) Filed: Dec. 3, 2014

(65) Prior Publication Data

US 2015/0089275 A1    Mar. 26, 2015

Related U.S. Application Data

(63) Continuation of application No. 13/755,794, filed on Jan. 31, 2013, now Pat. No. 8,949,655.

(51) Int. Cl.
G06F 11/20     (2006.01)
G06F 11/00     (2006.01)
(Continued)

(52) U.S. Cl.
CPC .......... *G06F 11/2023* (2013.01); *G06F 11/006* (2013.01); *G06F 11/0709* (2013.01); *G06F 11/2041* (2013.01); *G06F 11/2046* (2013.01); *H04L 41/0672* (2013.01);
(Continued)

(58) Field of Classification Search
CPC .............. G06F 11/2046; G06F 11/006; G06F 11/0709; G06F 11/2023; G06F 11/2041; G06F 11/1482; G06F 11/2038; G06F 11/0757; G06F 11/1438; G06F 9/45533; H04L 67/10; H04L 41/0672
See application file for complete search history.

(56) References Cited

U.S. PATENT DOCUMENTS 7,966,514 B2 *  6/2011  Surasinghe .......... G06F 11/1482
                                                  714/4.2
8,335,943 B2 * 12/2012  Kamath .............. G06F 11/2097
                                                  714/4.11
(Continued)

FOREIGN PATENT DOCUMENTS

EP    2418824 A1     2/2012
WO    2011011459 A2  1/2011
WO    2012130034 A1  10/2012

OTHER PUBLICATIONS

International Search Report Issued for PCT/US2014/012635 dated Apr. 25, 2014.
(Continued)

*Primary Examiner* — Nadeem Iqbal
(74) *Attorney, Agent, or Firm* — Kramer & Amado, P.C.

(57) ABSTRACT

Various exemplary embodiments relate to a method of preventing extreme coresidency hazards among application instances in a cloud network. The method includes determining a first failure group of a first instance of an application; establishing a connection with a second instance of a peer application; determining a second failure group of the second instance; comparing the first failure group to the second failure group; and establishing a second connection with a third instance of the peer application if the first failure group and the second failure group share a failure point.

18 Claims, 6 Drawing Sheets

(51) Int. Cl.
*G06F 11/07* (2006.01)
*H04L 12/24* (2006.01)
*H04L 29/08* (2006.01)
*H04L 12/26* (2006.01)

(52) U.S. Cl.
CPC ............ *H04L 67/10* (2013.01); *H04L 43/0852* (2013.01); *H04L 43/10* (2013.01)

(56) References Cited

U.S. PATENT DOCUMENTS

| | | | |
|---|---|---|---|
| 8,949,655 B2* | 2/2015 | Bauer | G06F 11/2046 714/4.1 |
| 9,009,385 B1* | 4/2015 | Juels | G06F 3/0622 711/130 |
| 2007/0067663 A1* | 3/2007 | Surasinghe | G06F 11/1482 714/4.1 |
| 2012/0159235 A1* | 6/2012 | Suganthi | G06F 11/2028 714/4.11 |
| 2014/0215272 A1* | 7/2014 | Bauer | G06F 11/2046 714/37 |

OTHER PUBLICATIONS

Eyal Bin et al., "Guaranteeing High Availability Goals for Virtual Machine Placement", Distributed Computing Systems, 2011 31st Inernational Conference on Jun. 20, 2011, IEEE, pp. 700-709.

* cited by examiner

PREVENTING EXTREME CORESIDENCY HAZARDS IN CLOUD COMPUTING

RELATED APPLICATIONS

This application is a continuation of U.S. patent application Ser. No. 13/755,794, filed on Jul. 31, 2013, the entire disclosure of which is hereby incorporated herein by reference.

TECHNICAL FIELD

Various exemplary embodiments disclosed herein relate generally to cloud computing.

BACKGROUND

Cloud computing allows a cloud provider to provide computing resources to a cloud consumer through the use of virtualized machines. Cloud computing allows optimized use of computing resources and may reduce computing costs for application service providers. Cloud computing allows rapid horizontal expansion of computing capability by allowing a cloud consumer to add additional virtual machine instances on demand. Given the benefits of cloud computing, various applications traditionally implemented as physical servers are being moved to the cloud.

SUMMARY

In traditional non-virtualized configurations, each application runs on a separate physical host with duplex blades (or servers). Under normal conditions, the processes on the standby blade are running and the active blade checkpoints session state data to the standby blade continuously, so that if the active blade fails the standby blade can take over the service promptly (e.g., within 15 seconds) with negligible loss of state, context, or data. Other applications running on different hosts may detect the failure during the failover time, but they are designed to handle the failure, e.g. by switching over to a (geo)redundant element or suspending service for a few seconds until the component is available.

Deployment of multiple high availability, i.e., redundant, application components across a minimal no-single-point-of-failure, physical host configuration, i.e., a pair, is referred to as extreme solution coresidency. In an extreme solution coresidency configuration suffering from a failure of a host, several applications may simultaneously experience loss of nominally 50% of their capacity (for active/active configurations) during a failure event, total loss of the active component (for active/standby configurations), or simplex exposure (for failure of the standby component). As the standby instances are activating, several of their servers may not be responding to requests since they are failing over at the same time; likewise, unaffected 'active' component instances may be indirectly impacted because nominally half of the other solution applications that they interwork with will be impacted because their active components were impacted by the same failure event. Thus, portions of the software running on a host that did not fail may be taking recovery action either to recover its own primary function or to recover access to some other application that it depends upon.

Highly available systems may be engineered with sufficient redundancy so that no single failure (e.g., failure of a server blade or hard disk drive) produces an unacceptable service disruption; this arrangement is called 'no single point of failure.'

The combination of virtualization technology and the cloud computing business model enables accountabilities for application deployment arrangements to be changed so that cloud consumers request and consume cloud computing resources such as virtual machines, and cloud service providers manage the allocation and mapping of those virtual resources to underlying physical hardware. While this arrangement gives cloud service providers maximum flexibility in operating their computing infrastructure, it creates the risk that a cloud service provider may inadvertently create a single-point-of-failure hazard for a cloud consumer's application or solution by hosting multiple application components on a single cloud infrastructure component.

A scenario describing one extreme coresidency hazard will now be described as an example. It should be apparent that extreme coresidency hazards may arise due to other scenarios and cloud network configurations. A user service may require service from both application component A and application component B to be available for normal operation. Service B may be implemented via a pool of component instances (e.g., B1, B2, B3, . . . ) The size of the pool may grow and shrink under control of a cloud network provider based on expected or actual workload. Each component instance of application component A may maintain active sessions with two or more instances of component B. For example, an instance of application component A may maintain a session with a primary instance of component B and a backup instance of component B. Maintaining active sessions with instances of component B may allow A to rapidly mitigate a failure of one instance of component B.

So-called 'anti-affinity rules' are used for cloud consumers to stipulate resource placement rules for cloud service providers to enforce to assure that no single point of failure hazards are created for cloud based applications. For example, anti-affinity rules may require a cloud service provider to host component B on at least two different physical resources. The anti-affinity rules, however, may not specify which component B instances the component A application connects to for a user service. Accordingly, component A may connect to two component B instances that are coresident on the same physical host even if another component B instance is available on a different physical host. The two component B instances may be described as being members of the same failure group. This scenario may be referred to as an extreme coresidency hazard because failure of a single physical host may result in the failure of both component B instances.

It should be apparent that numerous other extreme coresidency hazards may occur. In particular, as solutions become more complex and integrate a greater number of loosely coupled application components or instances, the risk of correlated failures may increase. Anti-affinity rules may also become less effective in more complex solutions because the effects of interrelated components may be unknown. Moreover, even if all interrelationships were known, designing and evaluating complex anti-affinity rules for every resource allocation or configuration change incurs overhead and may be infeasible.

In view of the foregoing, it would be desirable to provide methods to minimize extreme solution coresidency configurations. In particular, it would be desirable for applications to detect and remedy extreme solution coresidency configurations.

In light of the present need for mitigating the risk of extreme solution coresidency configurations, a brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a method of preventing single point of failure hazards among application instances in a cloud network. The method includes determining a first failure group of a first instance of an application; establishing a connection between the first instance and a second instance associated with a peer application; determining a second failure group of the second instance; comparing the first failure group to the second failure group; and establishing a second connection between the first instance and a third instance associated with the peer application if the first failure group and the second failure group share a failure point.

In various embodiments, the method further includes periodically requesting the failure group of at least one of the first instance and the second instance; receiving new failure group information of an updated instance; determining a new failure group of the updated instance; and comparing the new failure group to the first failure group.

In various embodiments, the method receiving failure group information of the third instance; determining a third failure group for the third instance; and comparing the third failure group to the first failure group.

In various embodiments, the method further includes: receiving a request for a failure group from an application; determining a failure group; and providing the failure group to the requesting application.

In various embodiments, the step of determining a failure group of an instance includes: sending a request to the instance of the peer application; receiving failure group information from the instance. The request may comply with a communications protocol used by the connection to the peer application. The request may include an extension to the communications protocol. The request may be sent outside of a communications channel used for communication with the peer application. The request may be sent to a different port than a port of the communications channel.

In various embodiments, the step of determining a failure group of an instance includes measuring a heuristic of the instance. The step of measuring a heuristic may include tracing a network path to the instance.

In various embodiments, comparing the first failure group to the second failure group includes generating a heuristic score for the first failure group and the second failure group. The heuristic score may be based at least in part on a length of a network path to the instance.

In various embodiments, the first failure group is a physical address of a computing resource executing a host application instance performing the method.

Various exemplary embodiments relate to the above described method encoded as executable instructions encoded on a machine-readable storage medium that may be executed by a processor. Various exemplary embodiments relate to an apparatus including a data storage operably connected to a processor configured to perform the above described method.

Various exemplary embodiments relate to a cloud network. The cloud network includes a data center having a plurality of computing resources including a plurality of processors; a cloud manager configured to: manage a plurality of application instances by assigning computing resources including at least one processor to each application instance; provide a universally unique identifier to an application instance identifying the at least one processor assigned to the application instance; provide a listing of network addresses of a plurality of peer application instances providing a service, wherein at least one of the application instances is configured to: determine a first universally unique identifier of a processor assigned to the application instance and a second universally unique identifier of a processor assigned to a peer application instance; determine whether the first universally unique identifier and the second universally unique identifier are members of a failure group; and select another network address from the listing if the first universally unique identifier and the second universally unique identifier are members of the same failure group.

It should be apparent that, in this manner, various exemplary embodiments enable application instances to minimize extreme coresidency hazards. In particular, by identifying and replacing peer application instances that are coresident with the local application instance or another peer application instance, various exemplary embodiments may protect against a single point of failure and/or decrease recovery time from a failover.

BRIEF DESCRIPTION OF THE DRAWINGS

In order to better understand various exemplary embodiments, reference is made to the accompanying drawings, wherein.

DETAILED DESCRIPTION

Figure 1:
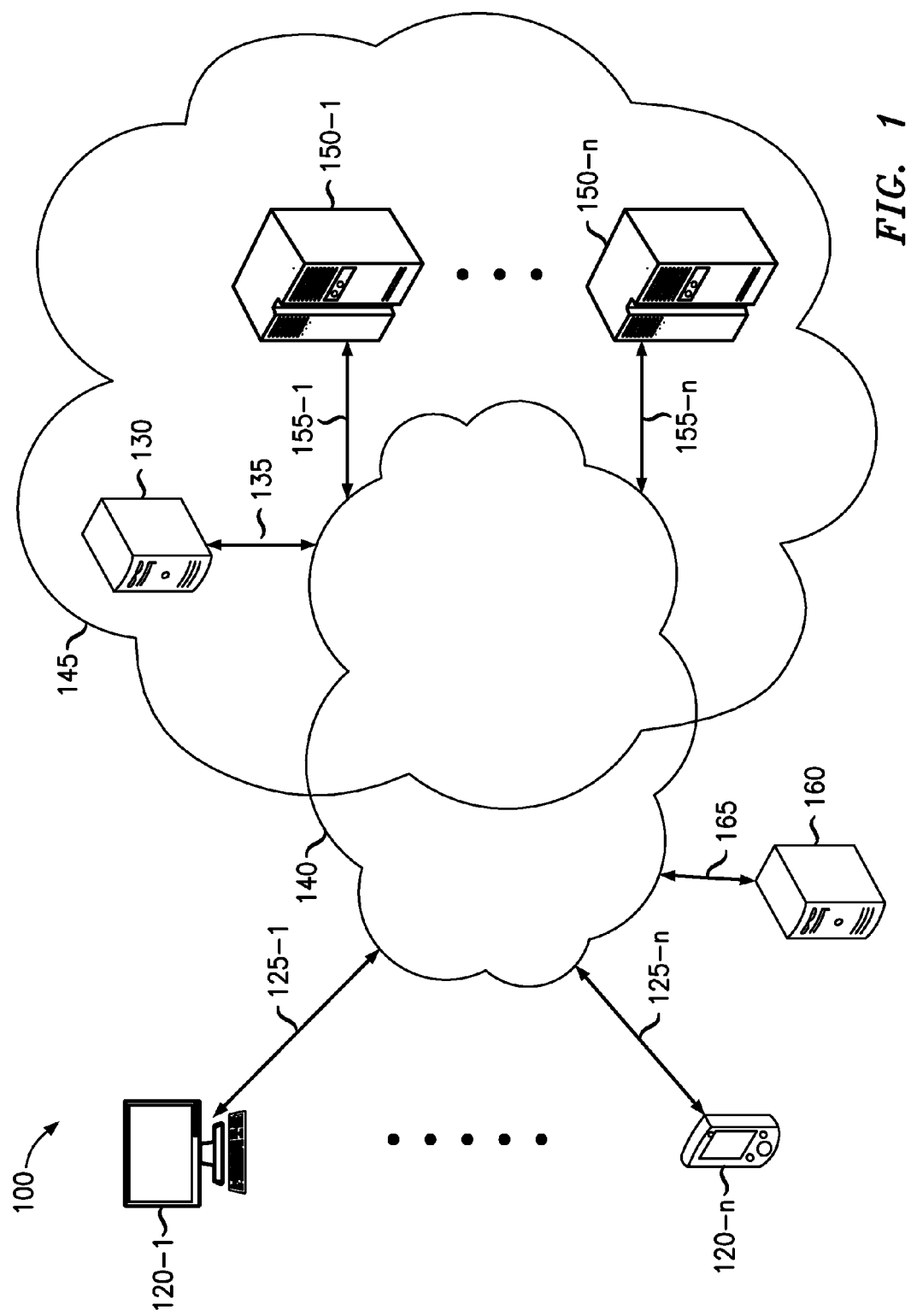
FIG. 1 illustrates a cloud network for providing cloud-based applications.

Referring now to the drawings, in which like numerals refer to like components or steps, there are disclosed broad aspects of various exemplary embodiments.

FIG. 1 illustrates a cloud network 100 for providing cloud-based applications. The cloud network 100 includes one or more clients 120-1-120-n (collectively, clients 120) accessing one or more allocated application instances (not shown for clarity) residing on one or more of data centers 150-1-150-n (collectively, data centers 150) over a communication path. The communication path includes an appropriate one of client communication channels 125-1-125-n (collectively, client communication channels 125), network 140, and one of data center communication channels 155-1-155-n (collectively, data center communication channels 155). The application instances are allocated in one or more of data centers 150 by a cloud manager 130 communicating with the data centers 150 via a cloud manager communication channel 135, the network 140 and an appropriate one of data center communication channels 155. The application instances may be controlled by an application provider 160, who has contracted with cloud service network 145.

Clients 120 may include any type of communication device(s) capable of sending or receiving information over network 140 via one or more of client communication channels 125. For example, a communication device may be a thin client, a smart phone (e.g., client 120-*n*), a personal or laptop computer (e.g., client 120-1), server, network device, tablet, television set-top box, media player or the like. Communication devices may rely on other resources within exemplary system to perform a portion of tasks, such as processing or storage, or may be capable of independently performing tasks. It should be appreciated that while two clients are illustrated here, system 100 may include fewer or more clients. Moreover, the number of clients at any one time may be dynamic as clients may be added or subtracted from the system at various times during operation.

The communication channels 125, 135 and 155 support communicating over one or more communication channels such as: wireless communications (e.g., LTE, GSM, and CDMA); WLAN communications (e.g., WiFi); packet network communications (e.g., IP); broadband communications (e.g., DOCSIS and DSL); storage communications (e.g., Fibre Channel, iSCSI) and the like. It should be appreciated that though depicted as a single connection, communication channels 125, 135 and 155 may be any number or combinations of communication channels.

Cloud manager 130 may be any apparatus that allocates and de-allocates the resources in data centers 150 to one or more application instances. In particular, a portion of the resources in data centers 150 are pooled and allocated to the application instances via component instances. It should be appreciated that while only one cloud manager is illustrated here, system 100 may include more cloud managers. In some embodiments, cloud manager 130 may be a hierarchical arrangement of cloud managers.

The term "component instance" as used herein means one or more allocated physical resources reserved to service requests from a particular client application. For example, an allocated physical resource may be processing/compute, memory, networking, storage or the like. In some embodiments, a component instance may be a virtual machine comprising processing/compute, memory and networking resources. In some embodiments, a component instance may be virtualized storage. The term "instance" may be used generically to refer to either a component instance or a software instance being executed by a component instance or other hardware.

The network 140 may include any number of access and edge nodes and network devices and any number and configuration of links. Moreover, it should be appreciated that network 140 may include any combination and any number of wireless, or wire line networks including: LTE, GSM, CDMA, Local Area Network(s) (LAN), Wireless Local Area Network(s) (WLAN), Wide Area Network (WAN), Metropolitan Area Network (MAN), or the like.

The network 145 represents a cloud provider network. The cloud provider network 145 may include the cloud manager 130, cloud manager communication channel 135, data centers 150, and data center communication channels 155. A cloud provider network 145 may host applications of a cloud consumer for access by clients 120 and/or other applications.

The data centers 150 may be geographically distributed and may include any types or configuration of resources. Resources may be any suitable device utilized by an application instance to service application requests from clients 120. For example, resources may be: servers, processor cores, memory devices, storage devices, networking devices or the like.

Applications manager 160 may provide various modules of application software to be executed by virtual machines provided by resources at data centers 150. For example, applications manager 160 may provide a website that is hosted by cloud services network 145. In this example, data centers 150 may generate one or more virtual machines that appear to clients 120 as one or more servers hosting the website. As another example, applications manager 160 may be a telecommunications service provider that provides a plurality of different network applications for managing subscriber services. The different network applications may each interact with clients 120 as well as other applications hosted by cloud services network 145. In various embodiments, applications manager 160 may be controlled by a cloud consumer.

The contract between the cloud consumer and cloud service provider may include a service level agreement (SLA) requiring cloud services network 145 to provide certain levels of service including protection against failure. To protect against failure, cloud service network 145 may provide a plurality of instances of one or more of the applications hosted at data centers 150 as determined by cloud manager 130. The cloud manager 130 may use anti-affinity rules provided by the cloud consumer to provide some protection against co-residency hazards. For example, cloud manager 130 may enforce the provided anti-affinity rules to ensure that a minimum number of different physical resources are used to provide instances of a particular application, or that load sharing applications use different physical resources. As interactions between applications become more complex, however, it becomes difficult to design anti-affinity rules and computationally difficult to implement such rules. This is particularly true in complex solutions that have multiple independent applications, which may be implemented by different application suppliers and are unaware of the details of each other, interworking to deliver rich application services to end users.

Figure 2:
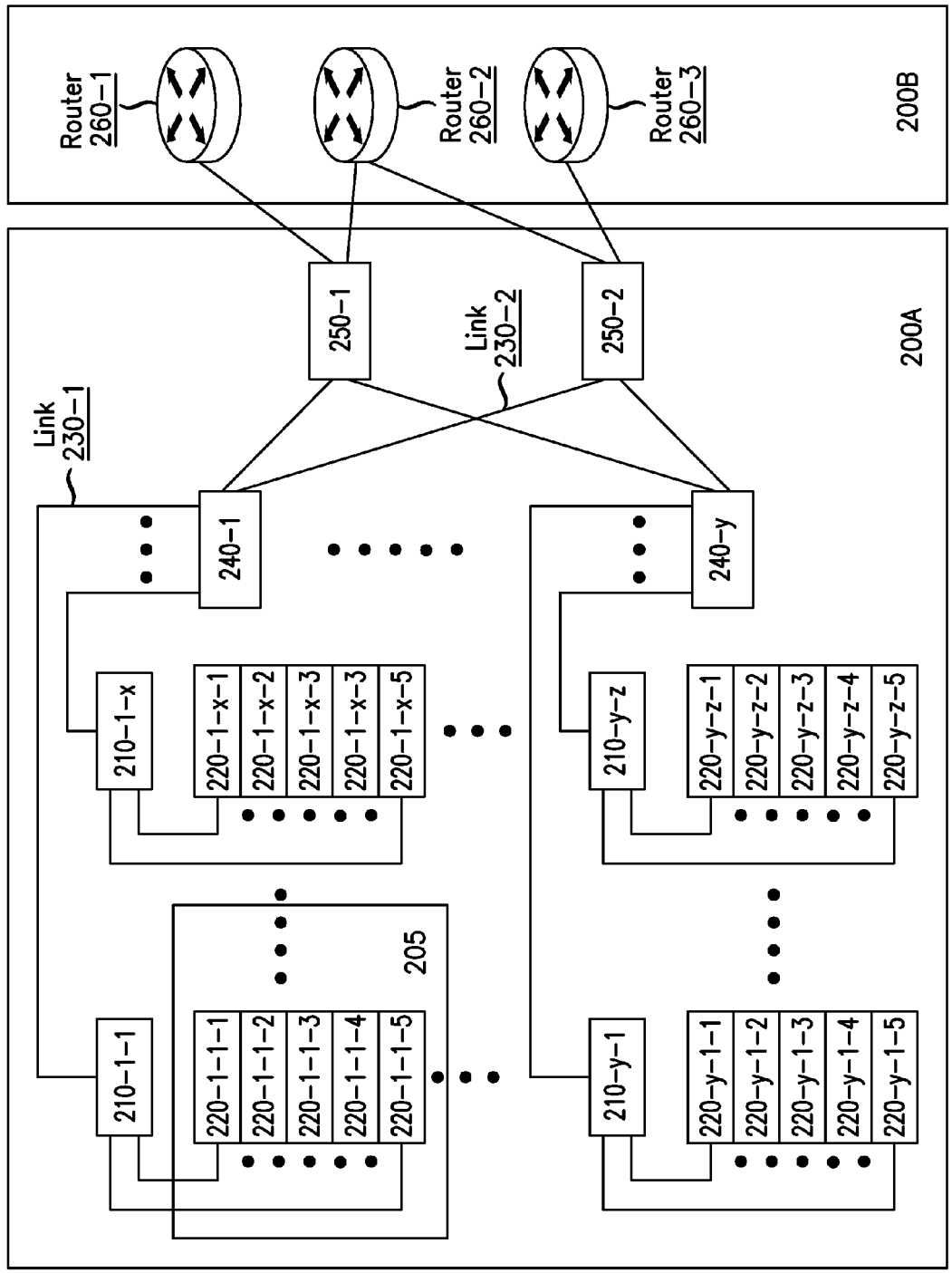
FIG. 2 schematically illustrates a data center and a portion of a network within a cloud network.

FIG. 2 schematically illustrates a data center 200A and a portion of a network 200B that may an embodiment of one of data centers 150 and a portion of network 140 of FIG. 1. The data center 200A includes the resources 220-1-1-1-220-*y*-*z*-5 (collectively, resources 220). Resources 220 are arranged in "y" rows, where each row contains a number (e.g., illustratively "x" or "y") of racks of resources (e.g., rack 205) that are accessed through a communication path. The communication path communicatively connects resources 220 with network 200B via an appropriate one of the top of the rack switches 210-1-1-210-*y*-*z* (collectively, TOR switches 210), an appropriate one of the end of the row switches 240-1-240-*n* (collectively, EOR switches 240), an appropriate one of the layer 2 aggregation switches 250-1-250-*n* (collectively, aggregation switches 250) and appropriate links 230-1-230-2 (collectively, links 230) (remaining link labels have been omitted for the purpose of clarity). Communication between data center 200A and network 200B is via one of aggregation switches 250, an appropriate one of routers 260-1-260-3 (collectively, routers 260), and appropriate links 230. It should be appreciated that a data center may be architected in any suitable configuration and that data center 200A is just one exemplary architecture being used for illustrative purposes. For example, the communication path may include any suitable configuration of devices (e.g., switches, routers, hubs, and the like) to switch data between the resources 220 and network 200B.

TOR switches 210 switch data between resources in an associated rack and an appropriate EOR switch. For example, TOR switch 210-1-1 switches data from resources in rack 205 to network 200B via an appropriate EOR switch (e.g., EOR switch 240-1).

Resources 220 may be any suitable device as described herein. It should be appreciated that while 5 resources are illustrated in each rack (e.g., rack 205), each rack may include fewer or more resources and that each rack may contain different types or numbers of resources. As illustrated, each resource 220 is labeled using a row-column-resource number nomenclature. For example, resource 220-2-3-4 would be the fourth resource in the rack residing in the second row and third column.

EOR switches 240 switch data between an associated TOR switch and an appropriate aggregation switch. For example, EOR switch 240-1 switches data from TOR switches 210-1-1-210-1-*x* to network 200B via an appropriate aggregation switch (e.g., aggregation switch 250-1 or 250-2).

Aggregation switches 250 switch data between an associated EOR switch and an appropriate router. For example, TOR switch 210-1-1 switches data from resources in rack 205 to network 200B via an appropriate EOR switch (e.g., EOR switch 240-1) and an appropriate aggregation switch (e.g., aggregation switch 250-1 or 250-2).

Routers 260 switch data between network 200B and data center 200A via an appropriate aggregation switch. For example, router 260-1 switches data from network 200B to data center 200A via aggregation switch 250-1.

A cloud provider network 145 may, to varying degree, hide information regarding the physical arrangement of data centers 150. A cloud provider may provide one or more network addresses for accessing one or more application instances hosted within cloud provider network 145. The application instances may be hosted on virtual machines that may use one or more resources at one or more of data centers 150. The cloud provider 145 may provide various means for providing or blocking access of an application instance, cloud consumer, or application manager to information concerning the resources used to host the application instance. In various embodiments, the cloud provider network 145 may completely block outside access to any information regarding the physical computing resources used by an application instance. In various embodiments, the cloud provider network 145 may allow an application instance to call one or more functions that provide information regarding physical resources. In various embodiments, the cloud provider network 145 may provide an application programming interface (API) providing functions that may be used by an application instance to determine information about the physical resources. For example, the cloud provider network 145 may provide an API that provides a universally unique identifier for a processor or component instance hosting an application instance. The API may return the universally unique identifier using a using a row-column-resource number nomenclature as described above regarding FIG. 2. Such an identifier may provide a mapping of the cloud network according to a known scheme. The API may also provide a mapping of the cloud provider network 145 or mapping information for an individual failure group or physical address.

Figure 3:
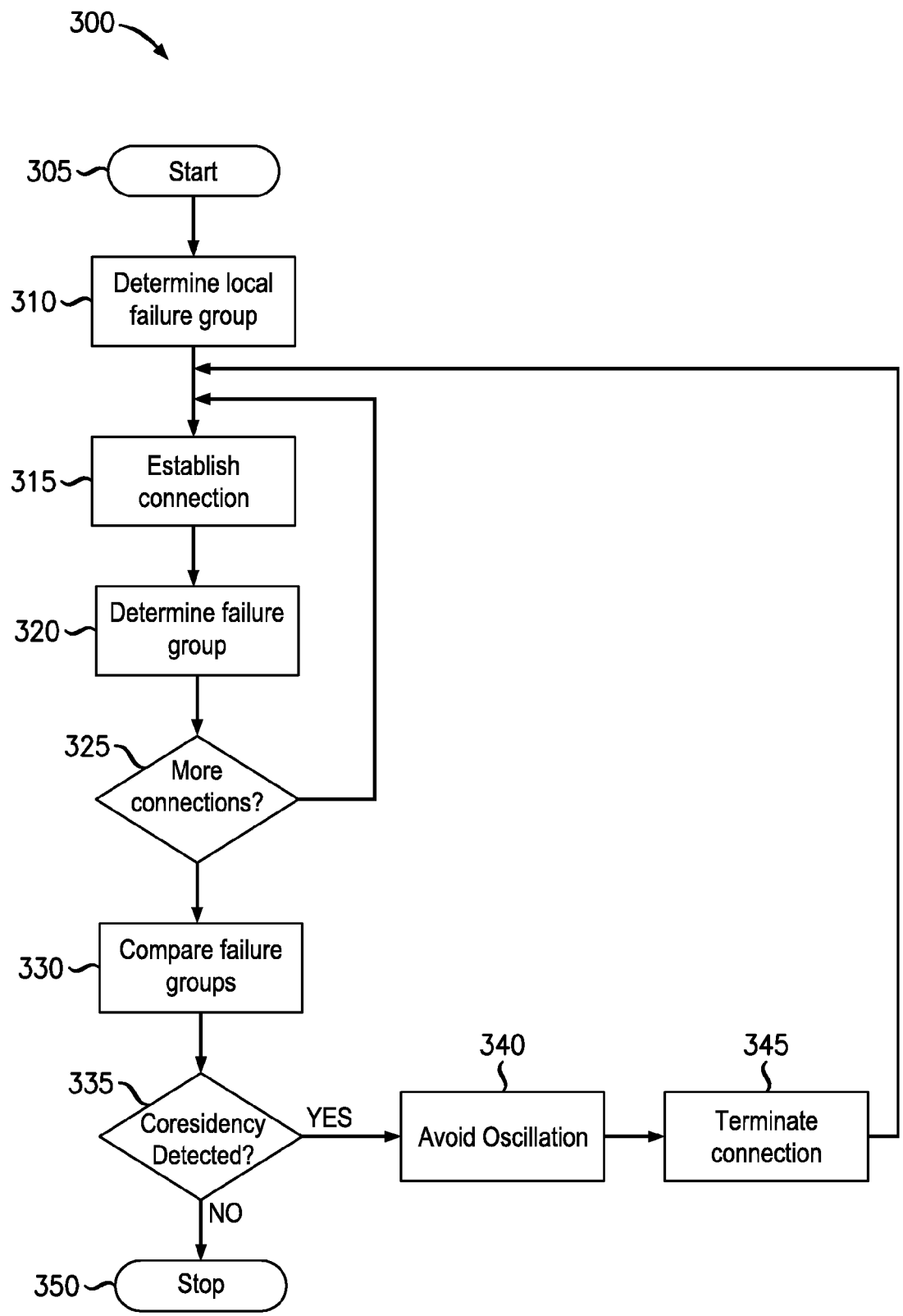
FIG. 3 illustrates a flowchart showing an exemplary method of protecting against extreme coresidency hazards.

FIG. 3 illustrates a flowchart showing an exemplary method 300 of protecting against extreme coresidency single point of failure hazards of applications. The method 300 may be performed by an instance of an application executing on resources 220 at a data center 150. In various embodiments, multiple interacting application instances may each perform method 300. For example, an application "A" may establish sessions or associations with multiple instances, such as a primary instance and a backup or protect instance, of another peer application "B." Application "B" may also establish sessions or associations with other peer applications. The method 300 may be performed by application A and/or application B. The method 300 may begin at step 305 and proceed to step 310.

In step 310, the application instance may determine a logical failure group of one or more resources the application instance is using. The application instance may use any method of determining a logical failure group allowed by the cloud service network 145 that is hosting the application instance. In various exemplary embodiments, the cloud service network 145 may provide functions for determining failure group information in the form of an application programming interface (API). The application instance may make a function call using the API to determine a logical failure group. The API may provide the application instance with failure group information such as a failure group identifier or an address such as a IP address, MAC address, or physical data center/bay/shelf/slot/socket level location. The failure group information may describe the processor executing the application instance and/or a higher level component representing the failure group.

In step 315, the application instance may establish a connection with a peer application instance. The peer application instance may be another application instance being executed by the same cloud network 145 or another cloud network, or the peer application may be an application executed by a web server. The application instance may use a domain name system (DNS) server to obtain a set of addresses of available instances of the peer application. If the peer application is hosted in a cloud service network 145, the cloud manager 130 may act as the DNS server and provide the addresses of available instances. The peer application may select an address from the DNS set and establish a peer connection according to an instance application protocol.

In step 320, the instance application may determine a logical failure group of the peer application instance. As described above regarding step 310, failure group information may include a failure group identifier or an address that is used to determine a failure group. In various embodiments, the instance application may use an instance application protocol or an extension of the instance application protocol to request failure group information from the peer application instance. For example, an instance application protocol such as, for example, RADIUS or Diameter, may include a field or attribute value pair (AVP) within a standard message that can be used to communicate a failure group information. As another example, the instance application protocol may be extended by adding an additional field, AVP, message type, or other extension to allow communication of failure group information.

In various embodiments, the instance application may request the failure group information from the peer application instance using an out of band communication channel. For example, the application instance and the peer application instance may establish a second connection using the same address with a different port to communicate failure group information. The second connection may use a query and response protocol to communicate failure group information.

In various embodiments, the application instance may use a heuristic measure to determine the failure group of the peer application instance. A heuristic measure may approximate a physical address of the peer application instance. For example, the application instance may use a function such as a traceroute to trace a network path to the peer application instance. An example traceroute function may use an internet control message protocol (ICMP) echo request with varying time to live values to trace a network path. A traceroute function may return a list of IP addresses of each node along the network path between the application instance and the peer application instance. Although IP addresses are network addresses rather than physical addresses, differing paths may indicate different physical hosts. Differing paths may also imply network diversity, which may be considered as part of a heuristic measure. The length of the network path, that is, the number of hops, may also be indicative of a physical address of the peer application instance. As another example, the application instance may use a measurement of network distance such as latency or response time. The application instance may periodically or continuously measure the latency or response time of communications with the peer application instance. A longer latency or response time may correspond to a greater physical distance to a peer application instance, whereas a short latency or response time may be indicative of coresidency. The application instance may determine a heuristic score based on one or more heuristic measurements.

In step 325, the application instance may determine whether it needs to connect to another application. The application instance may be configured to connect to a pre-determined number of applications. Critical application instances may want to maintain active connections to two component instances in two separate failure groups so application service is not significantly impacted when one of those component instances fails. For example, the application instance may connect to a primary peer application and a standby peer application. If the application instance needs to connect to another application, the method 300 may return to step 315. If the application instance does not require another connection, the method 300 may proceed to step 330.

In step 330, the application instance may compare one or more physical addresses. As will be described in further detail below regarding FIG. 4, the physical addresses may be compared based on the type of physical address. The application instance may compare the local physical address to the physical address of each peer application instance. The application instance may also compare the physical addresses of any equivalent peer application instances. Two or more peer application instances may be equivalent if they are instances of the same application. For example, the application instance may compare the physical addresses of an active peer application instance and a standby peer application instance to determine whether the active instance and standby instance are coresident and, therefore, members of the same failure group and subject to simultaneous failure.

In step 335, the application instance may determine whether any coresident application instances were detected. If coresidency was detected, the method 300 may proceed to step 340. If no coresidency is detected, the method 300 may proceed to step 350, where the method may end.

In step 340, the application instance may select a new peer application instance to avoid oscillation. For example, the application instance may select a new peer application instance from a list of available peer application instances. The application instance may determine whether replacing a coresident application instance with a new instance will result in oscillation. For example, if all application instances provided by the DNS server are coresident, changing application instances may result in oscillation. As another example, changing application instances may cause cloud manager 130 to reconfigure cloud resources such that the new peer application instance becomes coresident with the local application instance or another peer application instance. For example, the cloud manager 130 may change the resources for a virtual machine in order to increase efficiency or reduce latency. In order to avoid oscillation, the application instance may keep track of previous coresidency based changes and determine whether changing peer application instances has or will result in oscillation. The application instance may select new peer application instances that are less likely to result in oscillation.

In step 345, the application instance may terminate a connection to a peer application instance that is coresident with another application instance. In the case of a peer application that is coresident with the local application instance, there is only one connection that can be terminated. In the case where two or more peer application instances are coresident, the local application instance may select which connection to terminate. The local application instance may select the connection based on performance measurements. The method 300 may then return to step 315, where the local application instance may establish a new connection with the peer application instance selected in step 340. The local instance application may repeat any method steps as necessary until no coresidency is detected in step 335. In various embodiments, the local application instance may periodically repeat the method 300 to determine whether any changes have resulted in coresidency.

Figure 4:
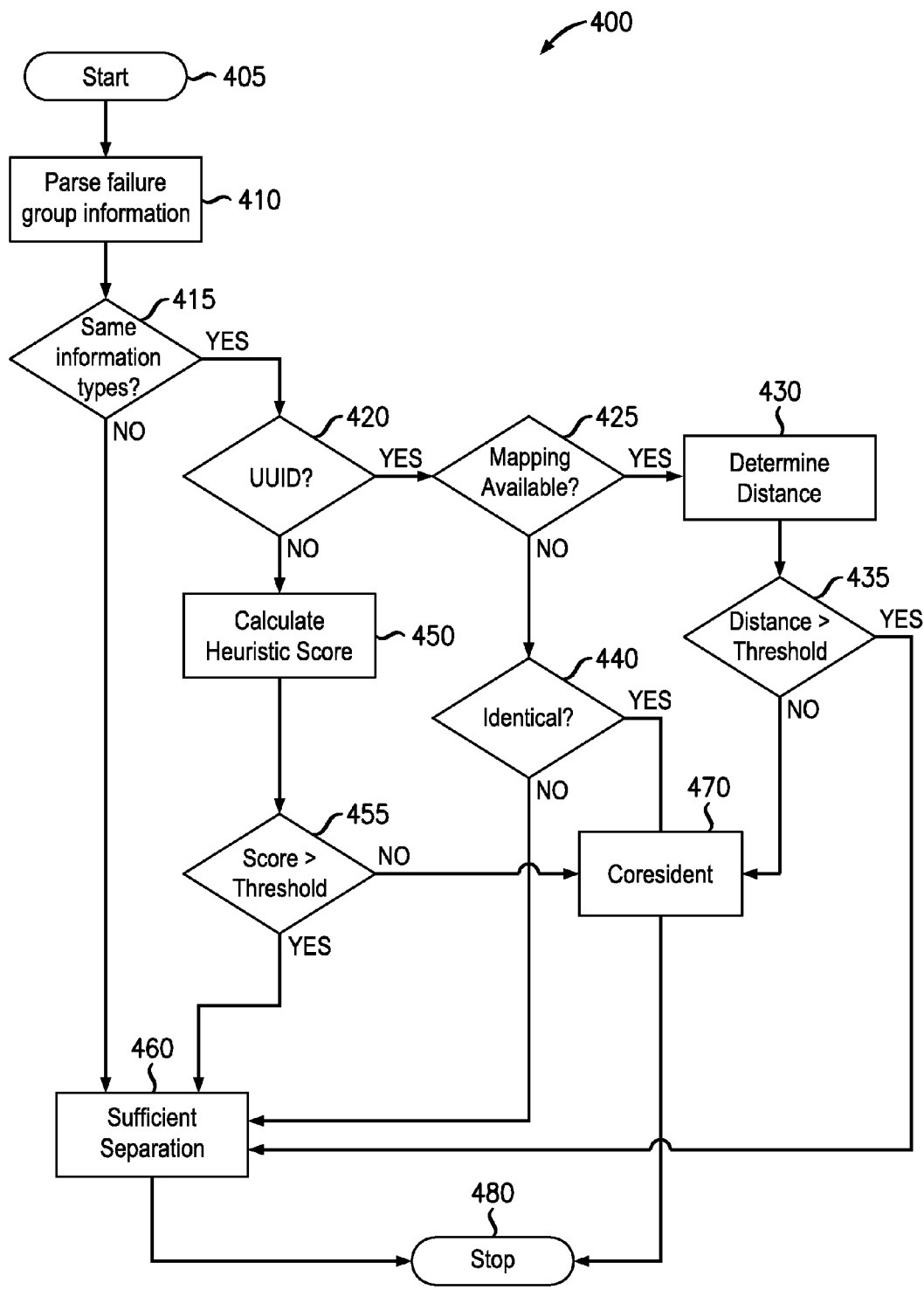
FIG. 4 illustrates a flowchart illustrating an exemplary method of comparing failure group information.

FIG. 4 illustrates a flowchart illustrating an exemplary method 400 of comparing failure group information. The method 400 may be performed by an application instance being executed by resources 220 at a data center 150. The method 400 may correspond to step 330 of method 300. The method 400 may begin at step 405 and proceed to step 410.

In step 410, the application instance may parse received failure group information and any physical address information included therein. The format of physical address information may vary based on the physical resources 220, cloud network provider 245, and/or the method of obtaining the failure group information. Parsing physical address information may include determining a physical address type. For example, if an application protocol is used to receive failure group information, the failure group information may be parsed according to the application protocol. As another example, a cloud service provider 145 may provide failure group information in a specific format. The application instance may compare the received information to known formats to parse the received information. As yet another example, the failure group information may be heuristic measurements that may be parsed based on the type of measurement. Once the failure group information has been parsed, the method 400 may proceed to step 415.

In step 415, the application instance may compare two or more sets of failure group information and determine whether the compared information are of the same information type. Failure group information of different types may indicate that the application instances are not coresident because the failure group information are formatted differently. Accordingly, it may be likely that the application instances are located on separate physical systems or even separate cloud systems. Therefore, it may be unlikely that the application instances are members of the same failure group or members of failure groups that share a failure point. If the failure group information are different types, the method 400 may proceed to step 460. If the failure group information are the same type, the method 400 may proceed to step 420.

In step 420, the application instance may determine whether the failure group information type is a universally unique identifier (UUID). In various embodiments, a cloud service network 145 may provide a UUID of each resource 220. For example, a cloud resource network 145 may identify a resource by data center, row, column, and resource as described above regarding FIG. 2. Other UUIDs such as a MAC address or other hardware characteristics may be used as physical addresses. If the received failure group information are UUIDs, the method 400 may proceed to step 425. If the received failure group information are not UUIDs, the method 400 may proceed to step 450.

In step 425, the application instance may determine whether a mapping is available for the UUID. In various embodiments, a cloud service network 145 may provide a mapping providing further information regarding resource locations. A mapping may be used to determine a relationship between two or more uniquely identified resources. In various embodiments, the UUID itself may provide a mapping by designating a particular location of the resource. If a mapping is available, the method 400 may proceed to step 430. If no mapping is available, the method 400 may proceed to step 440.

In step 430, the application instance may determine a distance between physical addresses to determine whether the physical addresses are in the same failure group. The distance may include a measurement such as a number of hops or a physical distance, or a qualitative measurement such as different racks, different data centers, or different time zones. The application instance may determine that two physical addresses are in the same failure group if the resources indicated by the physical addresses share a failure point. In step 435, the distance may be compared to a threshold distance. The threshold distance may measure the size of a failure group. For example, the threshold distance may be defined as being on different racks. A greater threshold may provide greater protection against failure. A greater distance, however, may also negatively affect performance. The application manager 160 may configure appropriate distance thresholds. If the distance is greater than a threshold, the physical addresses may have sufficient separation, and the method 400 may proceed to step 460. If the distance is less than the threshold, the physical addresses may be considered coresident or members of the same failure group, and the method may proceed to step 470.

In step 450, the application instance may determine a heuristic score for the failure group information based on one or more heuristic measurements. The heuristic measurement and heuristic score may represent the approximated physical location of the peer application and the distance between two instances. For example, if the network path is used as a heuristic measurement, the heuristic score may be determined based on the number of matching hops and the number of dissimilar hops.

In step 455, the heuristic score may be compared to a threshold score. The application manager 160 may configure appropriate heuristic score thresholds. A threshold score may be based on a heuristic score computed for a known distance. For example, the heuristic score for two instances known to be on different racks may be determined and used as the threshold score. If the score is greater than the threshold score, the physical addresses may have sufficient separation, and the method 400 may proceed to step 460. If the heuristic score is less than the threshold score, the physical addresses may be considered coresident or members of the same failure group, and the method may proceed to step 470.

In step 460, the method 400 may determine that failure group information indicates sufficient separation between the physical resources used by the application instances. The separation may indicate that it is unlikely the two instances will fail simultaneously. Therefore, the two instances may be considered members of separate failure groups. The method 400 may proceed to step 480, where the method may end.

In step 470, the method 400 may determine that the failure group information indicates that the subject application instances are coresident. The instances may share one or more resources, or use resources physically located in close proximity such that the resources are likely to fail simultaneously. The application instances may share a failure point and be considered members of the same failure group. The method 400 may proceed to step 480, where the method may end.

Figure 5:
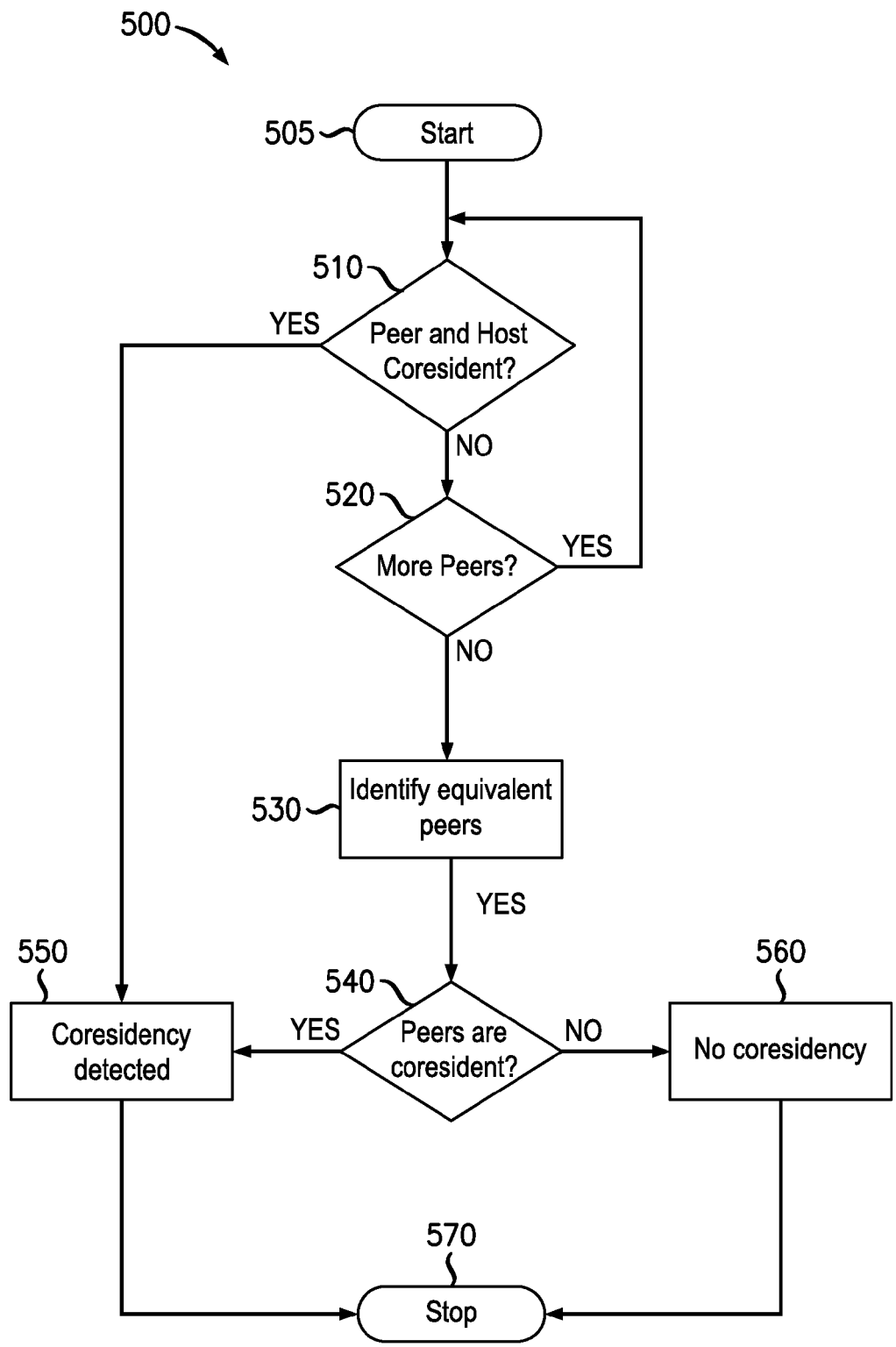
FIG. 5 illustrates a flowchart showing an exemplary method of detecting coresidency for an application instance.

FIG. 5 illustrates a flowchart showing an exemplary method 500 of detecting coresidency risks for an application instance. The method 500 may be performed by an application instance being executed by resources 220 at a data center 150. The method 500 may correspond to step 335 of method 300. The method 500 may begin at step 505 and proceed to step 510.

In step 510, the application instance may determine whether the local application instance and a peer application instance are coresident. Method 400 may be used to determine whether the application instance and peer instance application are coresident based on their physical addresses. If the local application instance and the peer application instance are coresident, the method 500 may proceed to step 550. If the local application instance and peer application instance are not coresident, the method 500 may proceed to step 520.

In step 520, the application instance may determine whether there are other peer application instances with which the local instance application interacts. If there are more peer application instances, the method 500 may return to step 510. Accordingly, the method 500 may determine whether any peer application instance is coresident with the local application instance. If there are no other peer application instances, the method 500 may proceed to step 530.

In step 530, the local application instance may identify sets of equivalent peers. Equivalent peers may include peer instance applications that perform similar or identical services. For example, equivalent peer instance applications may provide a database service to the local application instance. Equivalent peer instance applications may include an active and standby instance of the same application. Equivalent peer instance applications may also include any peers that share workload for a particular task. In various embodiments, the peer application instances may include different applications for performing a similar task. For example, two peer application instances may be provided by competing firms. The local application instance may be configured to identify equivalent peer application instances based on the function of the local application instance. It should be appreciated that it may be desirable to prevent equivalent peers from being coresident because coresident peers may not actually provide the benefit of redundancy that equivalent peers are assumed to provide. In other words, coresident equivalent peers may not provide protection against a single point of failure. For example, if the primary/active and standby/protecting application component instances are coresident, end users may be exposed to an extended service outage if a host failure simultaneously impacts both the active/primary and standby/protect instances. In various embodiments, the local application instance may be configured to identify all peer applications as equivalent. In such embodiments, the local application instance may determine whether any peer applications are coresident. Once equivalent peers are identified, the method 500 may proceed to step 540.

In step 540, the local application instance may determine whether any equivalent peers are coresident. The local application instance may use method 400 to compare the physical addresses of each set of equivalent peers. If the physical addresses indicate that the equivalent peers are coresident, the method 500 may proceed to step 550. If the physical addresses indicate that the equivalent peers have sufficient separation, the method 500 may proceed to step 560. Step 540 may be performed for each set of equivalent peers identified in step 530.

In step 550, the method 500 may determine that a coresidency has been detected. The method 500 may identify one or more peer application instances that are coresident. In step 560, the method 500 may determine that there is no coresidency risk for the local application instance. The result of step 550 and/or 560 may be used in step 335 of method 300 to determine whether coresidency has been detected. In either case, the method 500 may proceed to step 570, where the method ends.

Figure 6:
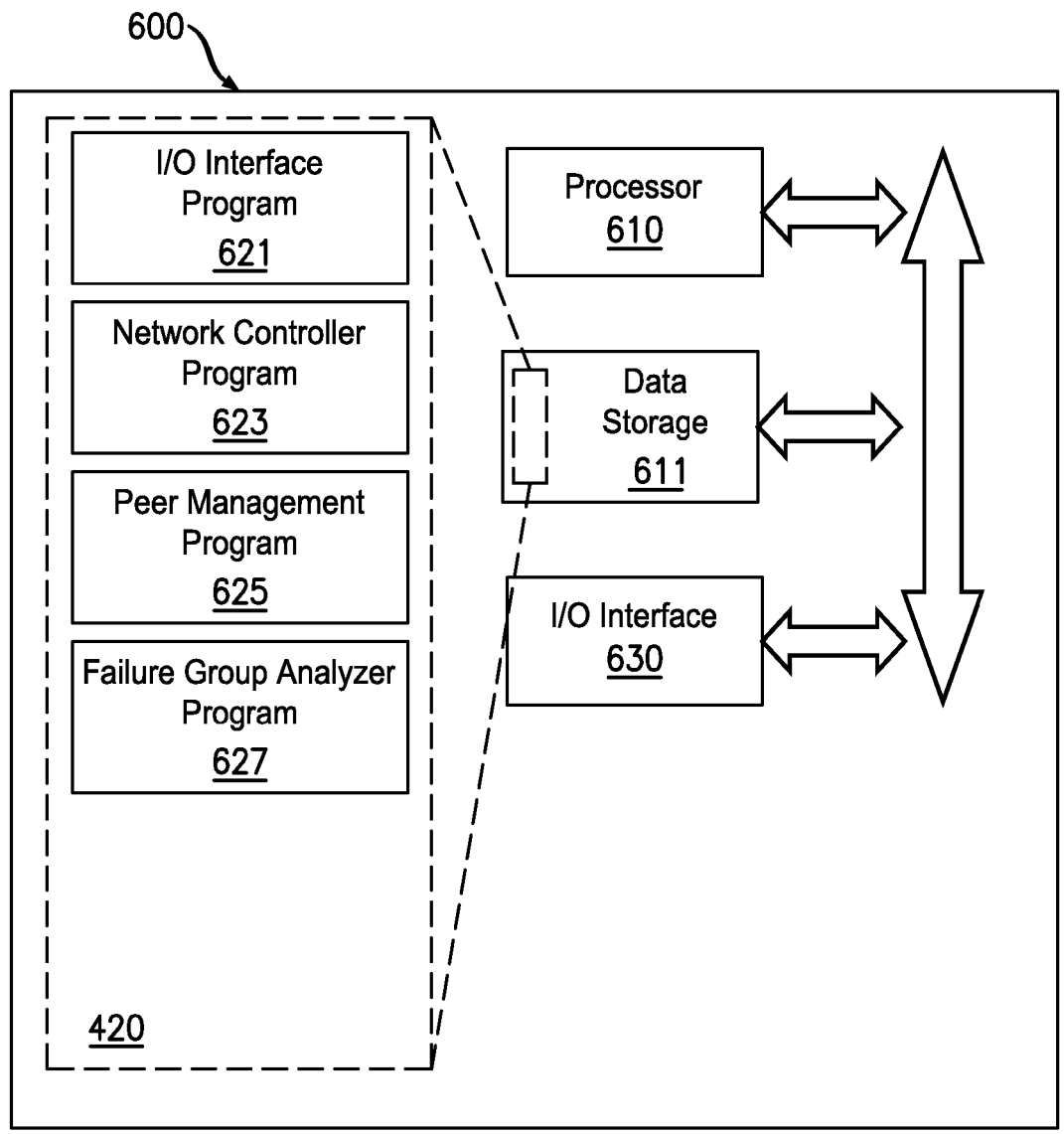
FIG. 6 schematically illustrates an embodiment of various apparatus of a cloud network.

FIG. 6 schematically illustrates an embodiment of various apparatus 600 of cloud network 100 such as resources 220. The apparatus 600 includes a processor 610, a data storage 611, and optionally an I/O interface 630.

The processor 610 controls the operation of the apparatus 600. The processor 610 cooperates with the data storage 611.

The data storage 611 stores programs 620 executable by the processor 610. Data storage 611 may also optionally store program data such as flow tables, cloud component assignments, or the like as appropriate.

The processor-executable programs 620 may include an I/O interface program 621, a network controller program 623, a peer management program 625, and failure group analyzer program 627. Processor 610 cooperates with processor-executable programs 620.

The I/O interface 630 cooperates with processor 610 and I/O interface program 621 to support communications over links 125, 135, and 155 of FIG. 1 as described above.

The network controller program 623 performs the steps 315 and 345 of method 300 of FIG. 3 as described above.

Peer management program 625 performs the method 300 of FIG. 3 or method 500 of FIG. 5 as described above.

The failure group analyzer program of 627 performs the method 400 of FIG. 4 as described above.

In some embodiments, the processor 610 may include resources such as processors/CPU cores, the I/O interface 630 may include any suitable network interfaces, or the data storage 611 may include memory or storage devices. Moreover the apparatus 600 may be any suitable physical hardware configuration such as: one or more server(s), blades consisting of components such as processor, memory, network interfaces or storage devices. In some of these embodiments, the apparatus 600 may include cloud network resources that are remote from each other.

In some embodiments, the apparatus 600 may be virtual machine. In some of these embodiments, the virtual machine may include components from different machines or be geographically dispersed. For example, the data storage 611 and the processor 610 may be in two different physical machines.

When processor-executable programs 620 are implemented on a processor 610, the program code segments combine with the processor to provide a unique device that operates analogously to specific logic circuits.

Although depicted and described herein with respect to embodiments in which, for example, programs and logic are stored within the data storage and the memory is communicatively connected to the processor, it should be appreciated that such information may be stored in any other suitable manner (e.g., using any suitable number of memories, storages or databases); using any suitable arrangement of memories, storages or databases communicatively connected to any suitable arrangement of devices; storing information in any suitable combination of memory(s), storage(s) or internal or external database(s); or using any suitable number of accessible external memories, storages or databases. As such, the term data storage referred to herein is meant to encompass all suitable combinations of memory(s), storage(s), and database(s).

According to the foregoing, various exemplary embodiments provide for application instances to minimize extreme coresidency hazards. In particular, by identifying and replacing peer application instances that are coresident with the local application instance or another peer application instance, various exemplary embodiments may protect against a single point of failure and thus minimize user service impact.

It should be apparent from the foregoing description that various exemplary embodiments of the invention may be implemented in hardware and/or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a machine-readable storage medium may include read-only memory (ROM), random-access memory (RAM), magnetic disk storage media, optical storage media, flash-memory devices, and similar storage media.

The functions of the various elements shown in the Figures, including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principals of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A non-transitory machine-readable storage medium encoded with instructions for execution by a processor, the non-transitory machine-readable storage medium comprising:
  instructions for defining a first virtual machine to be provided by the processor, wherein the instructions for defining a virtual machine comprise:
  instructions for identifying additional virtual machines that operate in conjunction with the first virtual machine;
  instructions for detecting whether any of the additional virtual machines presents a coresidency risk comprising:
    instructions for determining whether any two virtual machines of the additional virtual machines are coresident with each other;
  instructions for remedying coresidency risks detected as being presented by any of the additional virtual machines by designating at least one alternative virtual machine to operate in conjunction with the first virtual machine; and
  instructions for determining respective failure groups associated with the identified additional virtual machines by requesting and receiving failure group information from the identified additional virtual machines.

2. The non-transitory machine-readable storage medium of claim 1, wherein the instructions for detecting whether any of the additional virtual machines presents a coresidency risk further comprise instructions for determining whether any of additional virtual machines are coresident with the first virtual machine.

3. The non-transitory machine-readable storage medium of claim 1, wherein the instructions for identifying additional virtual machines that operate in conjunction with the first virtual machine comprise:
  instructions for identifying a group of virtual machines that provide a service to the first virtual machine of a shared service type, whereby the group of virtual machines are identified as the additional virtual machines by the instructions for identifying.

4. The non-transitory machine-readable storage medium of claim 1, wherein the instructions for remedying coresidency risks detected as being presented by any of the at least one other virtual machine by designating at least one alternative virtual machine to operate in conjunction with the first virtual machine comprise:
  instructions for terminating an existing connection with the at least one other virtual machine posing the coresidency risk; and
  instructions for establishing a new connection with the at least one alternative virtual machine.

5. The non-transitory machine-readable storage medium of claim 1, further comprising:
  instructions for tracking previous coresidency-based changes,
  wherein the instructions for remedying coresidency risks detected as being presented by any of the at least one other virtual machine by designating at least one alternative virtual machine to operate in conjunction with the first virtual machine comprise:
    instructions for evaluating the likelihood that selection of a particular virtual machine from a pool of available virtual machines as an alternative virtual machine of the at least one alternative virtual machine will cause oscillation based on the tracked previous coresidency-based changes, and
    instructions for selecting the at least one alternative virtual machine as a machine having a lower risk of causing oscillation than other available virtual machines.

6. The non-transitory machine-readable storage medium of claim 1, further comprising instructions for determining a failure group associated with the first virtual machine by requesting and receiving failure group information from a cloud service provider device via an application programmer interface provided by the cloud service provider device.

7. The non-transitory machine-readable storage medium of claim 6, wherein the failure group information comprises at least one of a failure group identifier and an address associated with the first virtual machine.

8. A cloud computing server comprising:
  a network interface;
  a memory; and
  a processor in communication with the network interface and the memory, the processor being configured to
  execute a first virtual machine, wherein executing the first virtual machine comprises:
    identifying additional virtual machines that operate in conjunction with the first virtual machine;
    detecting whether any of the additional virtual machines presents a coresidency risk comprising:
      determining whether any two virtual machines of the additional virtual machines are coresident with each other;
    remedying coresidency risks detected as being presented by any of the additional virtual machines by designating at least one alternative virtual machine to operate in conjunction with the first virtual machine; and
    determine respective failure groups associated with the identified additional virtual machines by requesting and receiving failure group information from the identified additional virtual machines.

9. The cloud computing server of claim 8, wherein in detecting whether any of the additional virtual machines presents a coresidency risk, the processor is further configured to determine whether any of additional virtual machines are coresident with the first virtual machine.

10. The cloud computing server of claim 8, wherein, in identifying additional virtual machines that operate in conjunction with the first virtual machine, the processor is configured to:
  identify a group of virtual machines that provide a service to the first virtual machine of a shared service type, whereby the group of virtual machines are identified as the additional virtual machines.

11. The cloud computing server of claim 8, wherein, in remedying coresidency risks detected as being presented by any of the at least one other virtual machine by designating at least one alternative virtual machine to operate in conjunction with the first virtual machine, the processor is configured to:
  terminate an existing connection between the first virtual machine and the at least one other virtual machine posing the coresidancy risk; and
  establish a new connection between the first virtual machine and the at least one alternative virtual machine.

12. The cloud computing server of claim 8, wherein the processor is further configured to:
  track previous coresidency-based changes,
  wherein, in remedying coresidency risks detected as being presented by any of the at least one other virtual machine by designating at least one alternative virtual machine to operate in conjunction with the first virtual machine, the processor is configured to:

evaluate the likelihood that selection of a particular virtual machine from a pool of available virtual machines as an alternative virtual machine of the at least one alternative virtual machine will cause oscillation based on the tracked previous coresidency-based changes, and select the at least one alternative virtual machine as a machine having a lower risk of causing oscillation than other available virtual machines.

13. The cloud computing server of claim 8, wherein the processor is further configured to determine a failure group associated with the first virtual machine by requesting and receiving failure group information from a cloud service provider device via an application programmer interface provided by the cloud service provider device.

14. The cloud computing server of claim 13, wherein the failure group information comprises at least one of a failure group identifier and an address associated with the first virtual machine.

15. A method performed by a cloud computing server providing a first instance of an application that is associated with a first failure group, the method comprising:

establishing a first connection between the first instance and a second instance associated with a peer application;

determining, by the processor, a second failure group associated with a second instance;

determining, by the processor, a third failure group associated with a third instance associated with the peer application;

comparing the third failure group to the second failure group; and establishing a second connection to a fourth instance associated with the peer application based on determining that the third failure group and the second failure group share a failure point.

16. The method of claim 15, further comprising terminating a third connection to the third instance based on determining that the third failure group and the second failure group share a failure point.

17. The method of claim 15, wherein the steps of determining the second failure group and determining the third failure group comprise retrieving failure group information from a cloud service provider device via an application programmer interface of the cloud service provider device.

18. The method of claim 15, wherein the steps of determining the second failure group and determining the third failure group comprise retrieving failure group information from the second instance and the third instance, respectively.

* * * * *